United States Patent [19]

Tsunoda et al.

[11] 4,298,974
[45] Nov. 3, 1981

[54] OPTICAL HEAD FOR A VIDEODISC PLAYER/RECORDER

[75] Inventors: Yoshito Tsunoda, Mitaka; Kimio Tatsuno, Kokubunji; Toshimitsu Miyauchi, Hachioji; Kunio Aiki, Hachioji; Ryoichi Ito, Hachioji, all of Japan

[73] Assignee: Hitachi, Ltd., Tokyo, Japan

[21] Appl. No.: 37,898

[22] Filed: May 10, 1979

[30] Foreign Application Priority Data

May 10, 1978 [JP] Japan .................................. 53-54502

[51] Int. Cl.$^3$ ............................................. G11B 7/14
[52] U.S. Cl. ........................................ 369/45; 369/44;
369/93; 369/111; 369/122; 346/76 L;
358/128.5; 250/201; 250/578
[58] Field of Search ............... 179/100.3 Z, 100.3 V,
179/100.1 G, 100.3 B; 360/77, 22, 23; 346/76
L; 358/128, 127, 128.5; 357/17; 250/201, 202,
55.3, 578

[56] References Cited

U.S. PATENT DOCUMENTS

| 3,431,513 | 3/1969 | Nannichi | 179/100.3 Z |
|---|---|---|---|
| 3,436,679 | 4/1969 | Fenner | 179/100.3 Z |
| 3,841,733 | 10/1974 | Ebersole | 179/100.3 Z |
| 3,866,238 | 2/1975 | Monroe | 346/76 L |
| 3,969,575 | 7/1976 | Gerritsen | 358/127 |
| 3,974,327 | 8/1976 | Von Dijk | 250/201 |
| 4,037,252 | 7/1977 | Janssen | 179/100.3 V |
| 4,051,528 | 9/1977 | Takeda | 179/100.3 Z |
| 4,085,423 | 4/1978 | Tsunoda | 179/100.3 V |

OTHER PUBLICATIONS

"A Review of the MCA Disco-Vision Systems", by Broadbent, Journal of the SMPTE, Jul. 1974, pp. 554-559.

*Primary Examiner*—Alan Faber
*Attorney, Agent, or Firm*—Craig and Antonelli

[57] ABSTRACT

An optical head comprising a semiconductor laser array which is used as a light source, and an optical system which guides laser beams from the array to a predetermined recording medium. The beam from one lasing point of the array is modulated by predetermined information and is used as a recording beam, while the beam from another lasing point is continuously oscillated and is used as a playback beam.

8 Claims, 8 Drawing Figures

OPTICAL HEAD FOR A VIDEODISC PLAYER/RECORDER

BACKGROUND OF THE INVENTION

1. Field of the Invention:

This invention relates to an optical head, and more particularly to an optical head which is suited for use with an optical disk for optically recording information.

2. Description of the Prior Art:

It has heretofore been known to optically record information onto and reproduce recorded information from a thin film made of, for example, a calcogenide glass material, such as a material of Te or a metallic material such as Bi. Since the manner of development and fixation of the material are unnecessary in this case, such applications may be used as are expected apparatuses which require the real time recording of video information, digital information etc. and the playback thereof immediately after the recording, for example, by means of a data recorder, a video disk device of the recording/playback type, etc. In known apparatuses, as a laser source for the recording of information which constitutes an optical head, a large-sized gas laser such as a Ar ion laser, a He-Cd laser and a He-Ne laser is employed, and for the playback of the information, a small-sized He-Ne laser, which is separate from the laser for the recording, is employed in order to avoid mutual interference between the recording and playback signals.

FIG. 1 shows a prior-art video disk device which employs the laser sources of the above-mentioned type. Referring to the figure, numeral 101 designates an Ar laser source for recording information having an output of, for example, 200 mW, while numeral 102 designates a He-Ne laser source for playing back information having an output of, for example, 1 mW. Numeral 103 indicates an optical modulator, numeral 104 a driver for driving the optical modulator to which the input information is applied, numeral 105 designates a lens, numeral 106 a one-half wave plate, numeral 107 a beam splitter, numeral 108 an objective lens, and numeral 109 a disk. Numeral 110 identifies a diffraction grating, numeral 111 a lens, numeral 112 a beam splitter, numeral 113 a galvano-mirror, numeral 114 a cylindrical lens, and numeral 115 a photodetector having a light receiving face which is divided into four areas of equal size. As is well known in the art, auto-focusing based on astigmatism is effected by the lens 114 and the photodetector 115.

The prior-art device above described has various disadvantages as stated below.

(1) The optical systems which are used independently of each other in order to guide laser beams from the respective laser sources onto the identical disk as minute spots of eight become complicated.

(2) In order to avoid mutual interference between the recording laser beam the directions of polarization of and the playback laser beam, the laser beams are caused to intersect orthogonally and are mixed and guided to the identical objective lens by the polarizing beam splitter, as illustrated in the FIG. 1. Therefore, the device becomes expensive, and the laser beams, which cannot be perfectly separated, still tend to mix with each other to some extent causing a deterioration of the focusing accuracy of the system.

(3) To accomplish separation from the recording beam, the playback beam must be used in the condition of the linearly polarized light. For this reason, a polarizing prism cannot be employed as the beam splitter for guiding the beam to the photodetector in the playback optical system. In consequence, a reflected beam from the disk returns to the He-Ne laser source to cause the so-called "back talk phenomenon", with the result that a large noise component appears in a reproduced signal.

(4) The necessary adjustments of the optical systems for focusing the beams from the two independent laser sources into the vicinity of a substantially identical point on the disk as minute spots are very difficult.

(5) In the auto-focusing control means heretofore employed an air floating lens is used which exploits the pneumatostatic pressure. With this means, however, the response is inferior when the vertical movements of the disk occur at a high frequency. Especially in the case where a base plate which constitutes the disk is made of plastic, the air floating lens cannot be used.

SUMMARY OF THE INVENTION

An object of this invention is to provide an optical head for recording and reproducing information which eliminates the various disadvantages stated above and which is simple in construction, low in cost and easy to adjust.

In order to accomplish such an object, according to this invention, a laser diode array having a plurality of lasing points is adopted as the optical head, and at least one of the lasing points is pulse-modulated, while at least one of the remaining lasing points is continuously oscillated.

DESCRIPTION OF THE PREFERRED EMBODIMENTS

Figure 1:
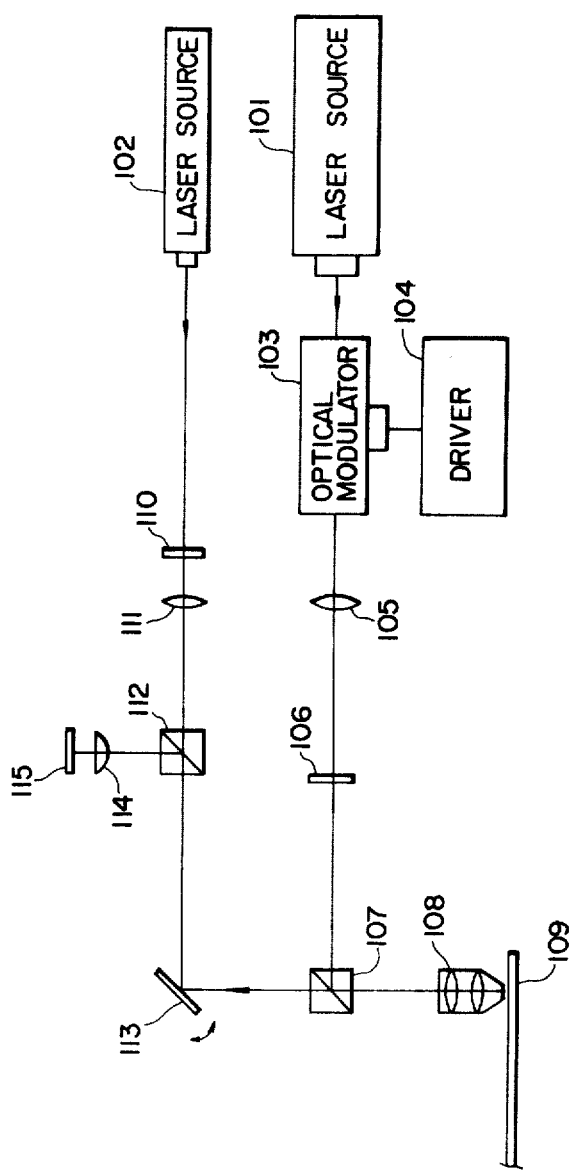
FIG. 1 is a schematic diagram showing an information recording and playback apparatus for explaining a prior-art optical head.
Figure 2:
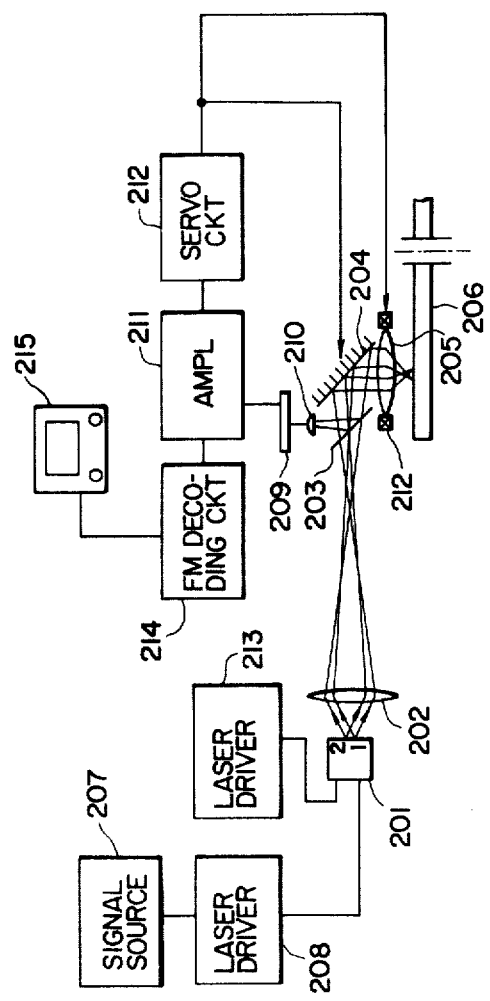
FIG. 2 is a schematic diagram showing the construction of an embodiment of this invention.

FIG. 2 is a schematic diagram of an information recording and playback apparatus for explaining an embodiment of the optical head according to this invention.

Referring to FIG. 2, a laser beam from a lasing point 1 on a semiconductor laser array 201 is converged onto a disk 206 after passing through or via a lens 202, a beam splitter 203, a galvano-mirror 204 and a converging lens 205. The laser source 201 is driven by a laser driver 208, such as pulse generator, which generates pulse signals modulated by information from a signal source 207. The laser oscillates in a pulsing manner at a comparatively high output, for example, at a peak value of 5 to 50 mW. A recording material, such as photoresist or metal thin film, is disposed on the disk 206.

In accordance with this invention, a laser beam from a lasing point 2 on the semiconductor laser array is employed for controlling the auto-focusing. More specifically, the laser beam from the lasing point 2 which is continuously oscillated at a low output (2 to 3 mW or below) by a d.c. voltage from a laser driver for playback 213 passes through the optical system in common with the laser beam from the lasing point 1 because the lasing points 1 and 2 are arranged at positions which are very close to one another, for example several hundreds, and the beams emergent therefrom are therefore received by the common coupling lens 202. Reflected light from the disk is guided onto a photodetector 209 by the beam splitter 203.

The photodetector 209 has its light receiving face divided into four areas of equal size. By placing a cylindrical lens 210 in front of the photodetector, variations in the spot shape based on astigmatism appear on the photodetector in correspondence with the up-and-down movements of the disk. Such a focusing control based on astigmatism is known in itself, as disclosed in, for example, U.S. Pat. No. 4,059,841. Since the laser beams from the lasing points 1 and 2 are converged onto proximate positions on the disk by the use of the common optical system, focusing control of the laser beam from the lasing point 1 can be simultaneously effected with the laser beam from the lasing point 2.

An output from the photodetector 209 passes through a preamplifier 211 and thereafter becomes an input to a servo circuit 212. The output of the servo circuit 212 drives a moving coil 212′, to control the converging lens 205. The servo circuit 212 also drives the galvanomirror 204.

Figure 3:
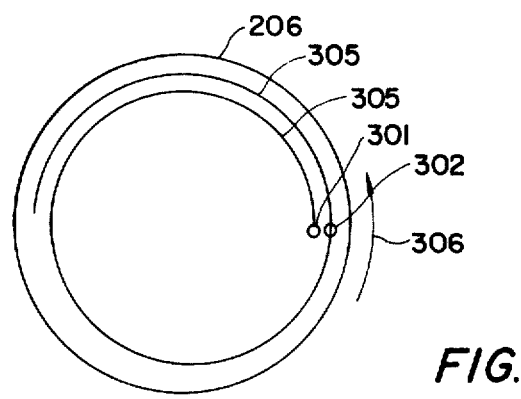
FIGS. 3 and 4 are diagrams respectively showing optical spot arrangements for explaining this invention.

On the other hand, the laser beam from the lasing point 2 also can be employed for the playback of information. After passing through the preamplifier 211, the output from the photodetector 209 is applied as an input to an FM decoding circuit 214, where the received information is detected. The information is reproduced by, for example, a TV monitor 215. In this case, especially according to this invention, the recorded information can be played back substantially upon starting the next recording as illustrated in FIG. 3. This becomes possible in such a way that the spot interval of the laser beams from the lasing points 1 and 2 is caused to correspond with the track pitch (for example, 2 μm) at which information recorded on the disk 206. This feature will now be explained with reference to FIG. 3.

In FIG. 3, numeral 301 designates a recording spot formed by the laser beam from the lasing point 1, numeral 302 a playback spot formed by the laser beam from the lasing point 2, and numeral 305 a recording track. An arrow 306 indicates the direction of rotation of the disk 206.

Figure 4:
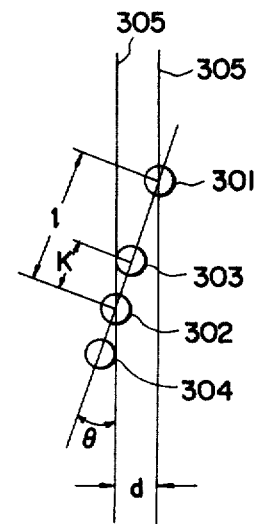

In order to cause the spots of the laser beams to correspond to the track pitch, the interval of the two lasing points on the laser array is made to equal $d \cdot m_2/m_1$, which is obtained by multiplying the ratio $m_2/m_1$ of the magnification $m_2$ of the converging lens 205 and the magnification $m_1$ of the lens 202 by the pitch d of the tracks 305. Assuming by way of example that $d = 2$ μm, that $m_2 = 40$ and that $m_1 = 4$, the interval of the lasing point becomes 20 μm. This may also be accomplished in another way, as shown in FIG. 4, wherein the two spots are arranged aslant to the tracks 305. In this case, the angle of inclination $\theta$ becomes $\theta = \sin^{-1} d/l$ where l denotes the distance between the two lasing points on the disk.

In the case of FIG. 4, the spot 301 is used for information recording, and the spot 302 is used for information playback and focusing control. Shown at 303 and 304 are spots which are employed for tracking and which are formed by laser beams from other lasing points on the semiconductor laser array. As described above, the inclination angle $\theta$ to the tracks 305 is given by $\theta = \sin^{-1} d/l$. In addition, the ratio between the distance l of the spots 301 and 302 and the distance K of the spots 302 and 303 is given by $l/K = d/r$. Here, r denotes the radius of the spot. Supposing by way of example $d = 2$ μm, $r = 0.5$ μm and $l = 100$ μm, then $K = 25$ μm. On the laser array, the K and l become values multiplied by $m_2/m_1$. For example, if $m_2/m_1 = 10$, then $l = 1$ mm and $K = 250$ μm, which are practical values.

Figure 5:
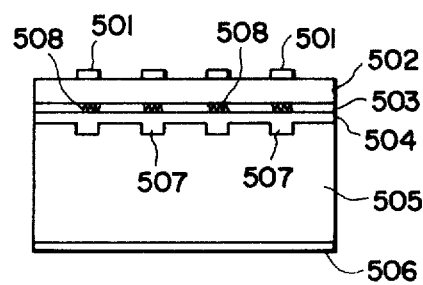
FIG. 5 is a schematic diagram showing the construction of a semiconductor laser array.

Suitable for the semiconductor laser array is one whose active region has a small stripe width, for example, a channeled substrate planar (CSP) laser or a buried heterostructure (BH) laser. An example of the structure of the former semiconductor laser array is shown in FIG. 5. It is easy to fabricate such a semiconductor laser array; that is, four lasers can be fabricated on an identical chip by an identical process in such a way that a mask having a plurality of channels is used for the fabrication. It is also easy to oscillate these lasers in continuous and pulse modes independently.

In FIG. 5, numeral 501 designates a positive electrode, numeral 502 a p-type GaAlAs layer, numeral 503 an n-type GaAs active layer, numeral 504 an n-type GaAlAs layer, numeral 505 an n-type GaAs layer, and numeral 506 a negative electrode. Numeral 507 indicates a channel width which is, for example, 5 to 7 μm. Shown at 508 are various lasing points.

Since the optical head according to this invention employs a semiconductor laser array having a plurality of lasing points, it is very effective in practical use. Using one of the laser beams from the respective lasing points for the recording, another for the playback and still another for the auto-focusing, various operations to be described hereunder can be realized with the optical head of this invention. The first manner of use is to employ the head for recording only. At this time, the laser beam from one lasing point is used for information recording, and the laser beam from another lasing point is used for auto-focusing control. In a second manner of use, the head is employed for playback only. Herein, the laser beam from one lasing point is used for playing back information recorded in advance, and no laser beam is generated from any other lasing point. In a third manner of use, the head is employed as a recording monitor. At this time, while a track recorded by the laser beam from one lasing point is being played back by the laser beam from the lasing point, the next information is recorded by the laser beam from another lasing point. A fourth manner of use is to employ the head for additional recording. Herein, in recording information by the use of the laser beam from one lasing point, a track which is already existent on the adjacent outer periphery is followed by the laser beam from another lasing point. Since the distance between the two spots is determined by the positional relationship of the two lasing points on the semiconductor laser array in advance, it is possible to record the new track after the fashion of the track already recorded.

Figure 6:
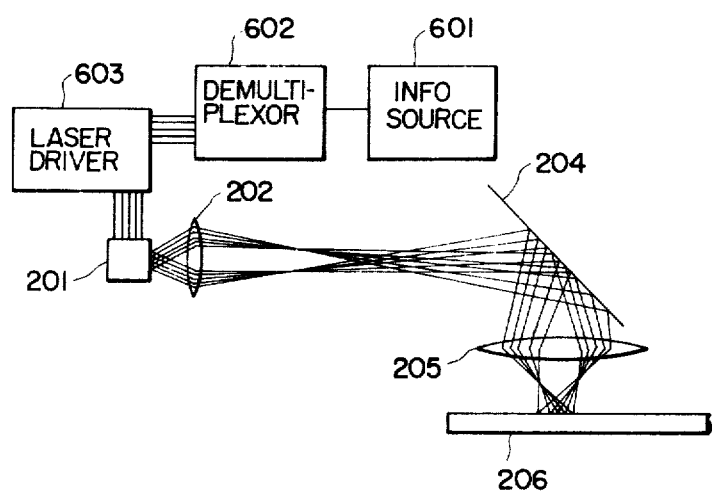
FIG. 6 is a schematic diagram showing the construction of another embodiment of this invention.

Further, according to this invention, information can be simultaneously recorded on a plurality of tracks by employing a plurality of (for example, five) lasing points in the semiconductor laser array. FIG. 6 is a diagram showing apparatus therefor. Referring to the figure, information to be recorded in the form of a multiplex signal is supplied from an information source 601 to a demultiplexor 602, whereupon the multiplex signal is converted into parallel signals corresponding to the five channels of information which are simultaneously applied to a semiconductor laser driver 603. Thus, the semiconductor laser array 201 is independently and directly modulated. As the information source 601, image PCM signals in a wide band etc. are considered. With five channels or so, it is ordinarily possible to record band-reduced image PCM signals.

In FIG. 6, the same symbols as in FIG. 2 indicate the same components. The means for controlling the lens 205 and the mirror 204 is omitted from the illustration of FIG. 6 because it is the same as in FIG. 2. In the semiconductor laser array 201 shown in FIG. 6, a lasing point which emits the laser beam for the auto-focusing control is similarly omitted.

Figure 7A:
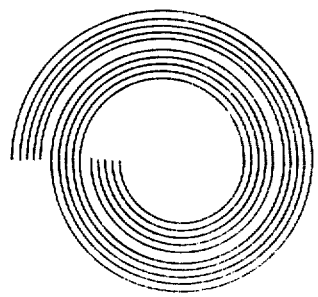
FIGS. 7(a) and 7(b) are respective diagrams for explaining the embodiment of FIG. 6.
Figure 7B:
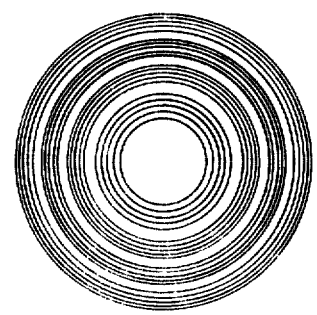

FIGS. 7(a) and 7(b) are diagrams showing the shapes of tracks which may be recorded with the apparatus illustrated in FIG. 6. In FIG. 7(a), the recorded tracks are spiral. In FIG. 7(b), the recorded tracks are concentrically circular.

By way of example, in the apparatus shown in FIG. 6, a track pitch of 2 μm is employed, the magnifying power of the lens 202 is four, and the magnifying power of the lens 205 is forty. Then, the intervals of the lasing points on the semiconductor laser array become 20 μm.

I claim:

1. An optical head for an information recording system including a laser source and optical means for guiding a laser beam from the laser source to a predetermined information recording medium, said optical head being characterized in that a semiconductor laser array of a plurality of lasing points formed on a common base plate is employed as said laser source, said optical means being arranged in common to receive the laser beams from the lasing points of said semiconductor laser array and to project said beams onto predetermined points of said information recording medium, first drive means for pulse modulating at least two of said plurality of lasing points in said semiconductor laser array including a source of multiplexed signals, a demultiplexer connected to said source and a driver circuit connecting the outputs from said demultiplexer to respective lasing points, and second driver means for continuously oscillating at least one of the remaining lasing points in said semiconductor laser array.

2. An optical head according to claim 1, wherein said optical means includes means for extracting from the continuously-oscillating light reflected from said recording medium signals to play back information recorded on said medium and signals indicative of the focusing of said laser beams on said medium.

3. An optical head according to claim 2, wherein said optical means includes a movable lens in the path of said beams to said recording medium, and means responsive to said signals indicative of the focusing of said laser beams for regulating the position of said movable lens.

4. An optical head according to claim 3, wherein said optical means further includes a coupling lens positioned in said path of said beams in the vicinity of said laser array, and means is further provided to move said information recording medium so that said laser beams are capable of tracking thereon.

5. An optical head according to claim 4, wherein the spacing of said lasing points on said laser array which are associated with said first and second driver means is equal to $d \cdot m_2/m_1$, wherein $m_1$ is the magnification of said coupling lens, $m_2$ is the magnification of said movable lens, and d is the pitch of the recording track on said recording medium.

6. An optical head according to claim 1, wherein the spacing of said lasing points on said laser array which are associated with said first and second driver means is 20 μm.

7. An optical head according to claim 1, wherein at least four lasing points are provided in a linear array.

8. An optical head according to claim 1, further including means to move said information recording medium so that said laser beams are capable of tracking thereon, at least three lasing points being provided in a linear array, and means for projecting the beams from said three lasing points onto said recording medium so that the line thereof extends at a predetermined angle to the recording track.

* * * * *